United States Patent
Parruck et al.

[11] Patent Number: 6,069,893
[45] Date of Patent: May 30, 2000

[54] ASYNCHRONOUS TRANSFER MODE SWITCHING ARCHITECTURES HAVING CONNECTION BUFFERS

[75] Inventors: Bidyut Parruck, San Jose; Chetan V. Sanghvi, Fremont, both of Calif.; Vinay Kumar Bhasin, Raipur, India; Makarand Dharmapurikar, Nanded, India; Uday Govind Joshi, Bombay, India

[73] Assignee: CoreEl MicroSystems, Fremont, Calif.

[21] Appl. No.: 08/959,056

[22] Filed: Oct. 28, 1997

Related U.S. Application Data

[60] Provisional application No. 60/029,652, Oct. 28, 1996.

[51] Int. Cl.[7] .............................. H04L 12/28; H04L 12/56
[52] U.S. Cl. .......................... 370/395; 370/412; 370/428
[58] Field of Search ..................................... 370/412, 468, 370/413–418, 230, 236, 428, 395, 397, 442

[56] References Cited

U.S. PATENT DOCUMENTS

| | | | |
|---|---|---|---|
| 5,448,559 | 9/1995 | Hayter et al. | 370/60.1 |
| 5,455,820 | 10/1995 | Yamada | 370/17 |
| 5,499,238 | 3/1996 | Shon | 370/60.1 |
| 5,500,858 | 3/1996 | McKeown | 370/60 |
| 5,517,495 | 5/1996 | Lund et al. | 370/60 |
| 5,550,823 | 8/1996 | Irie et al. | 370/60.1 |
| 5,557,035 | 9/1996 | Hayter et al. | 370/60 |
| 5,570,348 | 10/1996 | Holden | 370/17 |
| 5,689,506 | 11/1997 | Chiussi et al. | 370/388 |
| 5,793,747 | 8/1998 | Kline | 370/230 |
| 5,850,399 | 12/1998 | Ganmukhi et al. | 370/412 |
| 5,872,769 | 2/1999 | Caldara et al. | 370/230 |

OTHER PUBLICATIONS

International Preliminary Examination Report, Feb. 12, 1999 IPEA/US, 5 pages.
Notification of Transmittal of the International Search Report for International Application No. PCT/US97/19713.

*Primary Examiner*—Douglas W. Olms
*Assistant Examiner*—David R Vincent
*Attorney, Agent, or Firm*—Martine Penilla & Kim, LLP; Joseph A. Nguyen

[57] ABSTRACT

Improved methods and apparatus to facilitate switching Asynchronous Transfer Mode (ATM) cells through an ATM switching circuit are disclosed. The improved methods and apparatus facilitate the implementation of per virtual connection buffering, per virtual connection arbitration of ATM cells, and/or per virtual connection back-pressuring to improve switching efficiency and/or reduce the complexity and/or costs of the ATM switching circuit.

8 Claims, 8 Drawing Sheets

OUTPUT BUFFER SWITCH

HYBRID SWITCH

ASYNCHRONOUS TRANSFER MODE SWITCHING ARCHITECTURES HAVING CONNECTION BUFFERS

This application claims priority under 35 U.S.C 119 (e) of a provisional application entitled "Asynchronous Transfer Mode Switching Architectures Having Connection Buffers" filed Oct. 28, 1996 by inventor Bidyut Parruck, et al. (U.S. application Ser. No. 60/029,652).

BACKGROUND OF THE INVENTION

The present invention relates to digital data networks. More particularly, the present invention relates to apparatus and methods for improving communication among devices that are coupled to Asynchronous Transfer Mode (ATM) digital data networks.

Asynchronous Transfer Mode (ATM) is an emerging technology in the fields of telecommunication and computer networking. ATM permits different types of digital information (e.g., computer data, voice, video, and the like) to intermix and transmit over the same physical medium (i.e., copper wires, fiber optics, wireless transmission medium, and the like). ATM works well with data networks, e.g., the Internet, wherein digital data from a plurality of communication devices such as video cameras, telephones, television sets, facsimile machines, computers, printers, and the like, may be exchanged.

To facilitate discussion, prior art FIG. 1 illustrate a data network 100, including an ATM switch 102 and a plurality of communication devices 104, 106, 108, 110, and 112. ATM switch 102 may represent a digital switch for coupling, for either bidirectional or unidirectional transmission, two or more of the communication devices together for communication purpose and may represent a data network such as a local area network (LAN), a wide area network (WAN), or the global data network popularly known as the Internet. Each of communication devices 104, 106, 108, 110, and 112 is coupled to ATM switch 102 via a respective ATM port 104(p), 106(p), 108(p), 110(p), and 112(p). Each ATM port may include circuitry to translate data from its communication device into an ATM data format for transmission via ATM switch 102, and to translate ATM data transmitted via ATM switch 102 into a data format compatible with that communication device.

Irrespective of the source, data is transformed into an ATM data format prior to being transmitted via an ATM-enabled network. As is well known, typical ATM data cell includes a header portion and a data portion. Cell header portion may include information regarding the type of information being encapsulated in the ATM data cell, the destination for that information, and the like. Cell data portion typically includes the information being sent. By standardizing the format of the ATM cells, information from different communication devices may be readily intermixed and transmitted irrespective of its original format.

In the implementation of ATM technology in a data network, the challenge has been to improve the efficiency with which ATM switch 102 handles multiple simultaneous connections among the multiple communication devices. For peak efficiency, it is generally desirable to have an ATM switch that can handle a very large number of simultaneous connections while switching ATM data cells with minimal delay and maximum data integrity. Unfortunately, the high bandwidth demanded by such a design generally results in a prohibitively expensive ATM switch.

In the prior art, many ATM switch architectures have been proposed in the attempt to balance between switching capabilities and cost. In the figures that follow, a convention has been adopted for ease of illustration and understanding. It is assumed herein that ATM ports on the left side of a depicted ATM switch represents ATM input ports. Contrarily, ATM ports illustrated on the right side of a depicted ATM switch represent ATM output ports. In reality, most ATM ports are bidirectional and may be disposed at any location relative to the ATM switch. Furthermore, although only a few ATM ports are shown herein, the number of ATM ports coupled to a given ATM switch is theoretically unlimited. Accordingly, the convention is employed to facilitate discussion only and is not intended to be limiting in anyway.

FIG. 2A is a prior art illustration depicting an ATM switch architecture known as an input buffer switch. Input buffer switch 200 of FIG. 2 typically includes a switch matrix 202, which may represent a memory-less switching matrix for coupling data paths from one of input buffers 104(q), 108(q), and 110(q) to one of ATM output ports 110(p) and 112(p). Input buffers 104(q), 108(q), and 110(q) represent the memory structures for temporary buffering ATM data cells from respective ATM input ports 104(p), 106(p), and 108(p). ATM ports 104(p)–112(p) were discussed in connection with FIG. 1 above.

To reduce implementation cost, switch matrix 202 is typically a low bandwidth switch and can typically handle only a single data connection to a given output port at any given point in time. Consequently, when both ATM input ports 104(p) and 108(p) need to be coupled to ATM output port 110(p), switch matrix 202 typically needs to arbitrate according to some predefined arbitration scheme to decide which of the two data paths, 104(p)/110(p) or 108(p)/110(p), may be switched first. For discussion purposes, assume that switch matrix 202 is arbitrated to ATM input port 104(p), thereby coupling it to ATM output port 110(p). In this case, ATM cells are transmitted from ATM input ports 104(p) to ATM output port 110(p). ATM cells at ATM input port 108(p) are buffered in input buffer 108(q) while waiting for ATM port input 108(p) to be coupled to ATM output port 110(a). The buffered ATM cells are shown representatively in input buffer 108(q) as cells 204 and 206.

It has been found that the performance of input buffer switch 200 suffers from a phenomenon called "head-of-the-line blocking." To explain this phenomenon, assume that ATM cell 204 needs to be delivered to ATM output port 110(p) and therefore must wait until switch matrix 202 can couple ATM input port 108(p) with ATM output port 110(p). ATM cell 206, however, is destined for ATM output port 112(p). Nevertheless, ATM cell 206 is blocked by ATM cell 204, and must also wait until ATM cell 204 is first delivered to ATM output port 110(p). ATM cell 206 must wait even though it is not destined for ATM output port 110(p). Head-of-the-line blocking occurs when data buffering is performed on a per-input port basis, i.e., ATM cells from a given input port are queued together prior to being switched irrespective of the final destinations of the individual ATM cells. A high degree of head-of-the-line blocking is detrimental to the performance of input buffer switch 202 since it limits the throughput of ATM cells through the ATM switch.

Output buffer switch 230 of FIG. 2B represents another prior ATM switch architecture in which performance is maximized, albeit at a high cost. Output buffer switch 230 has output buffers 110(q) and 112(q) coupled to respective ATM output ports 110(p) and 112(p) for buffering the ATM cells output by switch matrix 232. For maximum performance, switch matrix 232 may represent a high bandwidth switch matrix capable of coupling multiple input ports to a single output port. For example, switch matrix 232 may couple ATM data from all three ATM input ports 104(p), 106(p), and 108(p) to output buffer 110(q) and output port 110(p). In other words, switch matrix 232 is capable of making N connections simultaneously to a single output port, where N represents the number of ATM input ports (i.e., 3 in the example of FIG. 2B). Compared to switch matrix 202 of FIG. 2A, switch matrix 232 of FIG. 2B typically requires N times the bandwidth to handle N simultaneous connections.

Output buffers, as mentioned, buffer ATM cells output by switch matrix 232. Since an output buffer, e.g., output buffer 110(q), may accept data from multiple different sources simultaneously via switch matrix 232, it is typically provided with N times the bandwidth of analogous input queue, e.g., input queue 104(q) of FIG. 2A. Although output buffer switch 230 suffers no performance degradation due to head-of-the-line blocking, the requirement of a high bandwidth switch matrix and multiple high bandwidth output buffers renders output buffer switch 230 expensive to build and maintain.

To reduce cost, a central output buffer switch architecture has also been proposed in the prior art. In the central output buffer switch architecture, switch matrix 232 may be endowed with a single central high bandwidth output buffer, which may be selectively coupled in a multiplexed manner in each ATM output ports 110(p) and 112(p). The central high bandwidth output buffer queues cells from the multiple ATM input ports and transmits them over time to the destination ATM output port. In this manner, individual output buffers, e.g., output buffers 110(q) and 112(q) of FIG. 2B, are eliminated. Since only one high bandwidth output buffer is required, the cost of implementing the central output buffer switch is generally lower compared to the cost of implementing the ATM output buffer switch. However, the requirement of a single large central output buffer still renders the central buffer switch architecture uneconomical for most applications. Further, the central buffer switch is typically configured for a fixed size network and does not lend itself to scalability. Additionally, the existence of the central output buffer renders the management centralized and complex.

FIG. 2C illustrates a prior art hybrid switch 260, representing another prior ATM switch architecture which attempts to tradeoff performance and cost. In hybrid switch 260, switch matrix 262 includes a central output buffer switch having a small central output buffer 264. Switch matrix 262 represents the high-bandwidth switch matrix similar to that discussed in FIG. 2B. However, small central output buffer 264 is typically smaller than the full-bandwidth buffer employed in the central output buffer switch architecture of FIG. 2B, making the hybrid implementation less costly than the central output buffer switch architecture.

To enable the use of small central output buffer 264, data buffering is also performed on the input ports. FIG. 2C shows input buffers 104(q), 106(q), and 108(q), which are coupled to respective ATM input ports 104(p), 106(p), and 108(p). During operation, small central output buffer 264 is employed to buffer cells output by switch matrix 262. When small central output buffer 264 is full, input buffering is performed at individual ATM input ports. When this happens, the input buffers are said to be back-pressured by the switch matrix. Back-pressuring an input buffer results in the input buffer being employed for buffering the incoming ATM cells. As discussed in connection with FIG. 2A, the use of input buffering on the ATM input ports disadvantageously presents the possibility of performance degradation due to head-of-the-line blocking.

As can be appreciated from the foregoing, ATM switch designers are constantly searching for ways to improve switch performance and to lower implementation cost. Particularly, there are desired improved ATM switching architectures and methods therefor that advantageously maximize ATM cell throughput for multiple simultaneous connections. The desired ATM switching architectures and methods therefor preferably include structures and techniques for minimizing head-of-the-line blocking and for controlling the throughput of individual connections in order to improve traffic control through the switch, thereby maximizing performance for an ATM switch of a given size.

SUMMARY OF THE INVENTION

The invention relates, in one embodiment, to methods and apparatuses for switching ATM cells through an ATM switch. In contrast to prior art approaches, which buffer ATM cells on a per-port basis, the invention includes structures and techniques that permit buffering to be performed on a per-virtual connection basis irrespective of the number of connections coupled through a given ATM port.

In another embodiment, the invention includes structures and techniques that permit output buffering, either on a per-virtual connection basis or through a more simplified buffering structure.

In yet another embodiment, the invention includes structures and techniques that permit per-virtual connection back pressure. As a consequence, head-of-the-line blocking is advantageously minimized when switching multiple simultaneous connections. When buffering and back-pressuring are performed on a per-virtual connection basis, control of individual virtual connections is advantageously facilitated, thereby enhancing the throughput of the resultant ATM switch.

These and other advantages of the present invention will become apparent upon reading the following detailed descriptions and studying the various figures of the drawings.

DESCRIPTION OF THE PREFERRED EMBODIMENTS

An invention is described for improving communication among devices that are coupled to Asynchronous Transfer Mode (ATM) digital data networks. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

Figure 1:
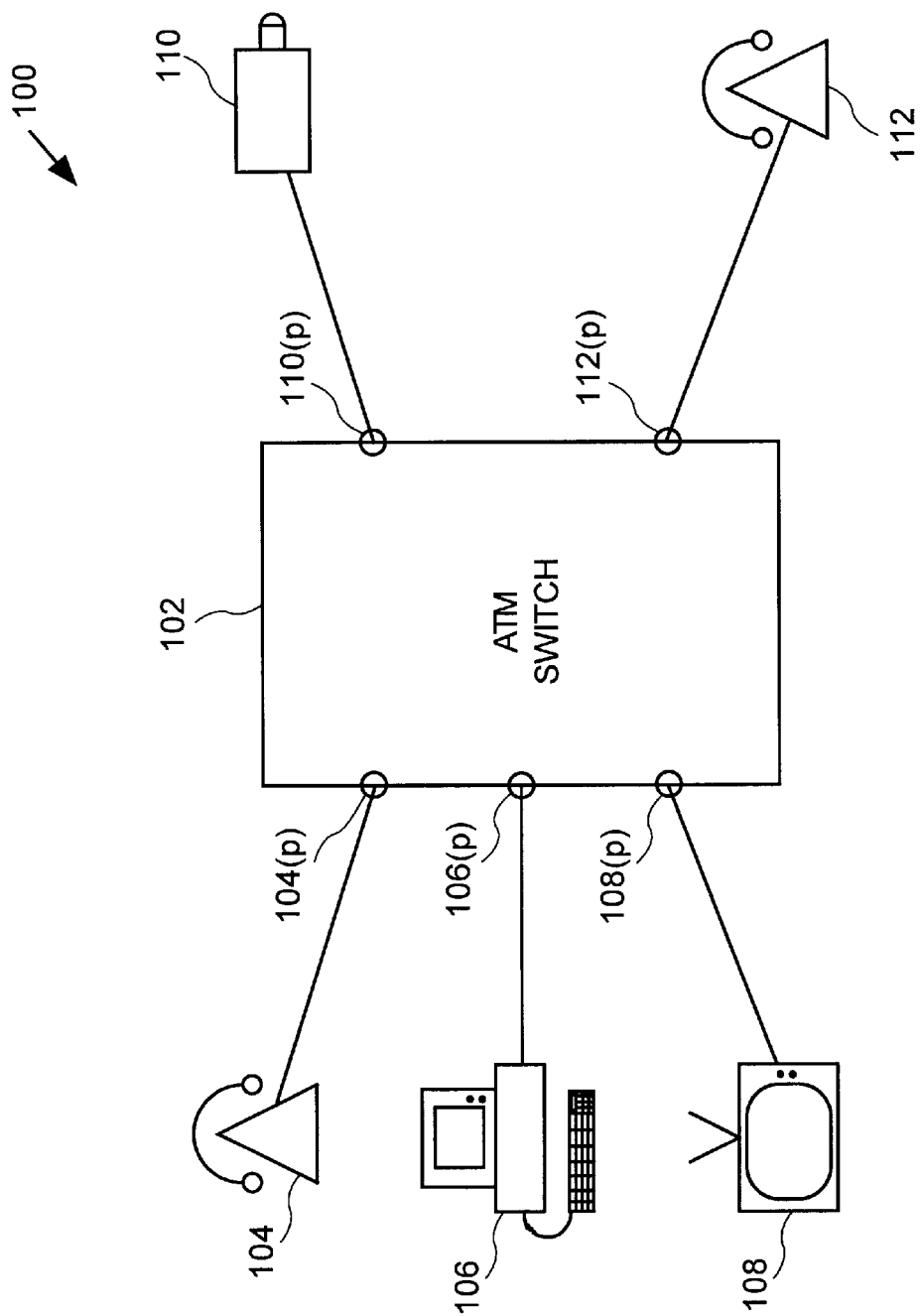
FIG. 1 illustrates a typical data network, including an ATM switch and a plurality of communication devices connected thereto.
Figure 2A:
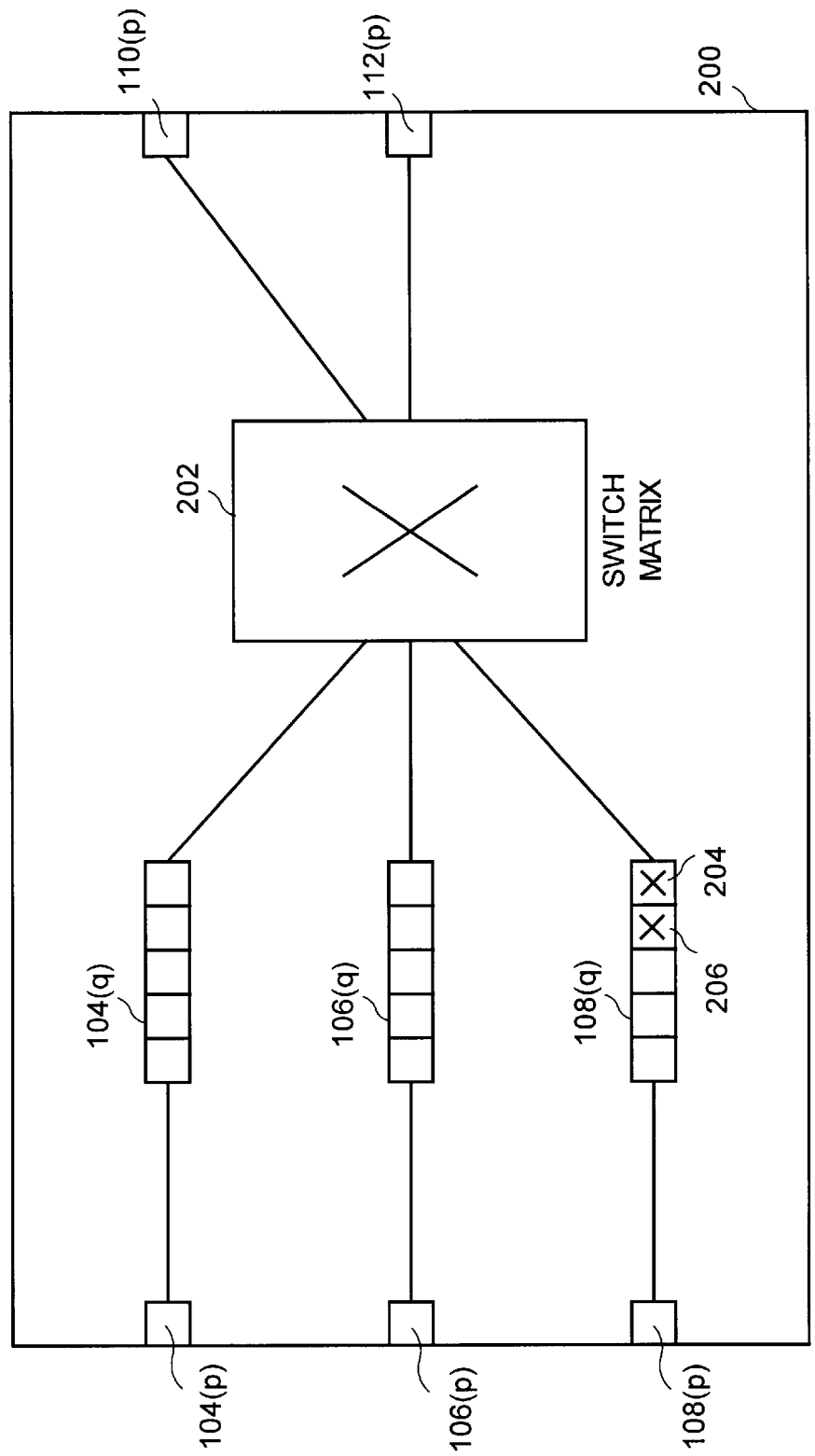
FIG. 2A is a prior art illustration depicting an ATM switch architecture known as an input buffer switch.
Figure 2B:
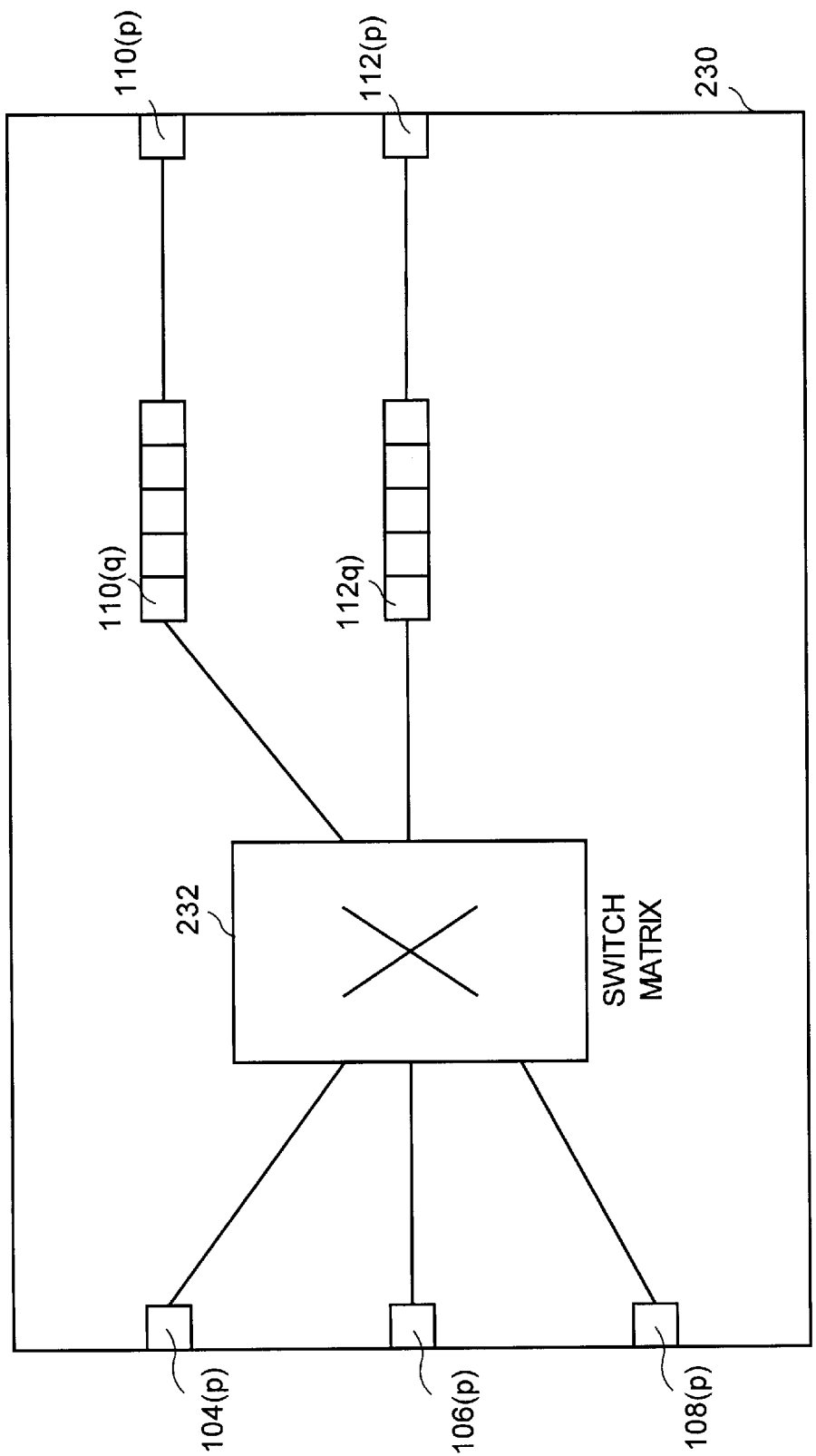
FIG. 2B is a prior art illustration depicting an ATM switch architecture known as an output buffer switch.

In accordance with one aspect of the present invention, head-of-the-line blocking is minimized by providing input buffering for each connection through the ATM switch. In contrast to the prior art implementations wherein input buffering of incoming ATM cells is performed on a per port basis (e.g., per input port as discussed in connection with FIG. 2A), a given input port of the inventive ATM switch may be provided with multiple buffering structures, with each buffering structure servicing a connection from a traffic generator coupled to that ATM input port.

Figure 3:
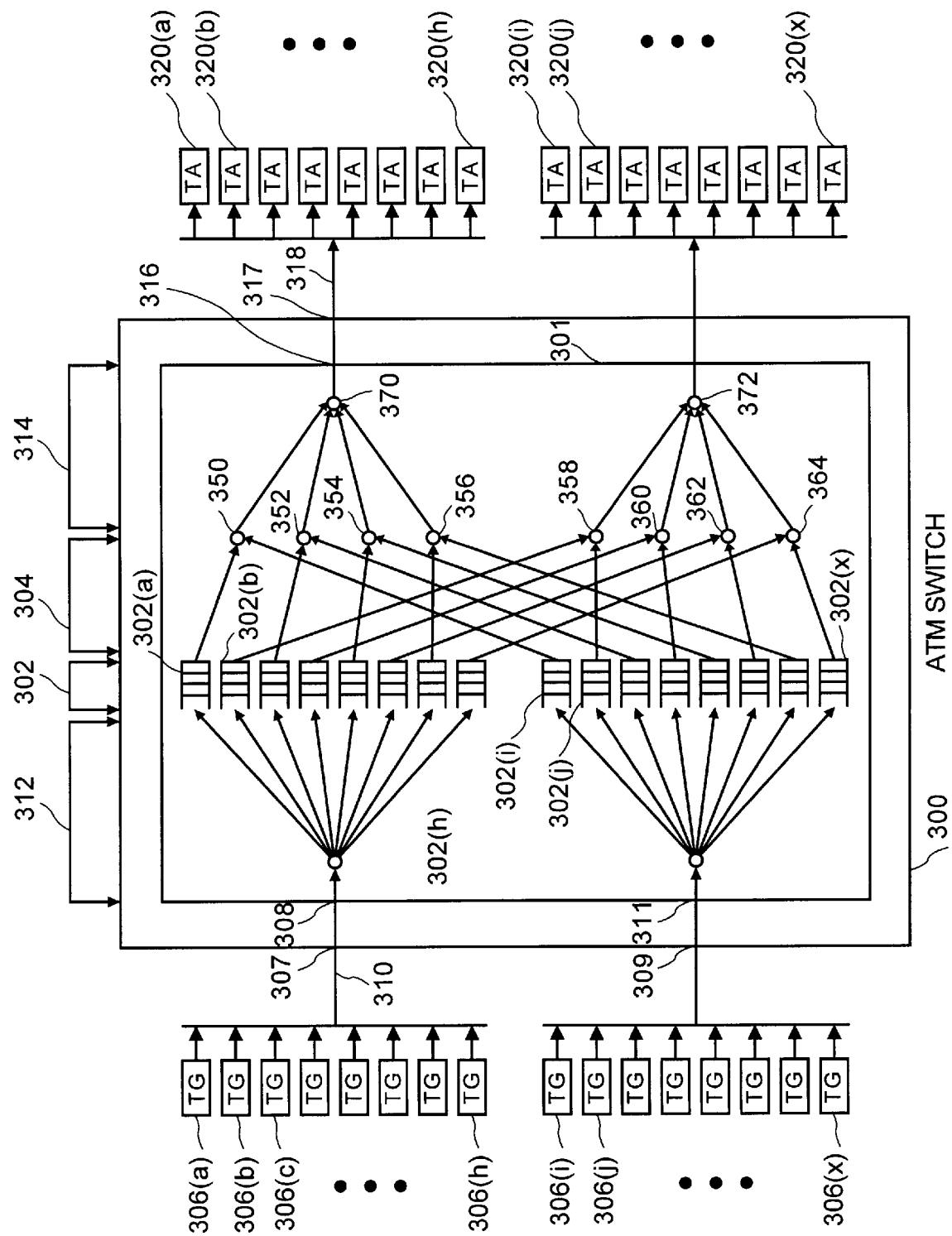
FIG. 3 illustrates, in accordance with one embodiment of the present invention, an inventive ATM switch which offers per virtual connection buffering.

To further elaborate, FIG. 3 illustrates, in accordance with one embodiment of the present invention, an inventive ATM switch 300, including inventive switch element 301 having a buffer portion 302 and a switch matrix portion 304. Switch element 301 is coupled to a plurality of traffic generators TG 306(a)–TG 306(x). Traffic generators TG 306(a)–TG 306(h) couple to ATM switch 300 via an ATM input port 307, and traffic generators TG 306(i)–TG 306(x) couple to ATM switch 300 via an ATM input port 309. Each traffic generator, e.g., TG 306(a) or TG 306(b), represents an ATM cell source, which may include one or more communication devices generating the ATM cells to be input into switch element 301 for switching. For ease of discussion, only devices and structures connected to ATM port 307 of FIG. 3 (and subsequent FIGS. 4 and 5) will be discussed in detail. Devices and structures coupled to lower ATM port 309 operate in a similar manner and are generally omitted from the discussion for brevity sake.

A traffic generator typically has a corresponding buffer structure within buffer portion 302 of switch element 301 to buffer the incoming ATM cells. For example, buffer structure 302(a) is provided to buffer ATM cells from traffic generator TG 306(a), buffer structure 302(b) is provided to buffer ATM cells from traffic generator TG 306(b), and so on. When data buffering is associated with the virtual data connection between a traffic generator and a destination, such data buffering is referred to herein as per-virtual connection or per-VC buffering. The connection is virtual since it does not represent a tangible, physical connection but is instead a data connection between two defined devices, with multiple connections capable of sharing a single ATM port. This data buffering technique is different from prior art approaches wherein data buffering is typically associated with an ATM input (or output) port irrespective of the number of traffic generators coupled to that port.

A buffer structure may be implemented as a dedicated queue in hardware or as a memory construct in digital memory. When implemented as a memory construct, the buffer structure may be made dynamic, e.g., as a linked list or a double linked list in random access memory, and implementation costs is advantageously reduced thereby since a large number of buffer structures may be inexpensively implemented in this manner.

As is typically the case, multiple traffic generators may be coupled together and communicate with ATM switch 300 via a common link. FIG. 3 shows traffic generators TG 306(a)–TG 306(h) being coupled to ATM input port 309 via a link 310. Link 310 may represent any data link, e.g., copper wires, fiber optics, a physical medium for wireless transmission, a common bus, and is preferably a 622 Megabits per second (Mbps) link in one embodiment.

Input routing portion 312 distributes traffic from traffic generators 316(a)–316(h) to respective buffer structures 302(a)–302(h). From buffer structures 302(a)–302(h), ATM cells are switched via switch matrix portion 304 and an output arbitrating portion 314 to its appropriate output destinations via switch matrix output port 316 of switch element 301 and link 318. Arbitrating portion 314 represents the circuitry for arbitrating access to link 318 and may be implemented in any conventional manner. The destinations are shown in FIG. 3 as traffic acceptors TA 320(a)–TA 320(x), representing communication devices that receive the ATM cells from traffic generators TG 306(a)–TG 306(x) via switch element 301.

Any traffic generator may be coupled with any traffic acceptor via switch element 301. When a traffic generator and a traffic acceptor are switched via switch element 301, a connection is made. A connection is distinguished from a path since a path couples an ATM input port to an ATM output port and may include many different connections. For ease of understanding, a path may be analogized to a freeway. The lanes on the freeway represent connections. Cars move in lanes and analogously, ATM cells are switched along a connection.

As can be seen from FIG. 3, the present invention permits input data buffering to be performed on a per-VC basis within switch element 301. As mentioned earlier, this is different from prior art ATM switch implementations wherein data buffering is performed only on a per-port basis. The per-VC buffering technique advantageously minimizes head-of-the-line blocking since ATM cells associated with different connections, i.e., destined for different traffic acceptors, are not buffered by the same buffer structure. When ATM cells a buffered, they are all associated with the same connection, i.e., destined for the same traffic acceptor, and no head-of-the-line blocking exists.

To employ the analogy above, a car A going to a destination A will be in lane A, and a car B going to a destination B will be in lane B. Traffic slowdowns (buffering) occur one a lane-by-lane basis (connection-by-connection) in accordance with the inventive per-VC buffering technique. Accordingly, car A going to destination A will not be impeded if car B is stalled.

In contrast, the prior art buffers on a per-port basis. Using the same analogy, both car A and car B are channeled through a bottleneck (per-port buffer) in the prior art. If car B is stalled in the bottleneck (buffered in the per-port buffer), car A will be held up in the buffer if it is behind car B although the destination of car A is entirely different from the destination of car B.

Per-VC buffering may be accomplished using any conventional memory technology, e.g., on memory chips or in some other types of physical memory devices such as magnetic, optical, or laser devices. In accordance with one aspect of the present invention, per-VC buffering is preferably implemented within switch element 301. Further, the use of semiconductor memory to implement buffer structures 302(a)–302(h) makes it possible to place a large number of buffers structures on the same chip as the switch matrix, thereby enabling ATM switch 300 to be offered in relatively few chips.

In one embodiment, output arbitrating portion 314 includes schedulers 350, 352, 354, 356, 358, 360, 362, and 362 as well as selectors 370 and 372 for arbitrating access for connections from switch matrix portion 304 to link 318 for output. In accordance with one aspect of the present invention, arbitration is performed on a per-VC basis, with a scheduler being coupled to connections having the same priority for switching. A connection may have a higher priority for switching if it contains information that is more time-sensitive than a connection having a lower priority for switching. By way of example, a connection carrying a telephone conversation typically has a higher priority than a connection carrying electronic mail. If the former connection is delayed, the telephone conversation becomes garbled. If the latter connection is delayed, there is little, if any, consequence.

With reference to FIG. 3, scheduler 350 is coupled to both buffer structure 302(a) and buffer structure 302(i), which have the same priority. Likewise, scheduler 352 is coupled to both buffer structure 302(b) and buffer structure 302(j), which have the same priority. Of course, each scheduler may be coupled to as many buffer structures as needed, and there is no requirement that two schedulers must be coupled to the same number of buffer structures. The schedulers then select cells from the connections (buffer structures) with which it is coupled in accordance to some preselected schedule.

In one embodiment, a scheduler selects ATM cells among the connections with which it is coupled using a round-robin selection technique, with each connection being selected in turn, a weighted round-robin technique, or with other conventional selection techniques that ensure appropriate selection for the nature of the information carried on the multiple connections. For example, scheduler 350 may select in a round robin manner between ATM cells from buffer structure 302(a) and buffer structure 302(I).

With respect to weighted round-robin, there may be, for example, 6 VC's: A, B, C, D, E, and F. Each VC may be assigned a different weight, e.g., a weight of 2 for each of A, B, and C, and a weight of 1 for each of D, E, and F. Then the scheduler may output the following pattern, for example, A, A/D/B, B/E/C, C/F and so on. On the other hand, this implementation, while being adequate for some switches, gives rise to bursts of data from VC's A, B, and C.

In another embodiment, the inventive weighted round robin may interleave the VC's with the same weight and produce an output pattern of A, B/D/C, A/E/B, C,/F and so on. This is accomplished by, for example, assigning VC's with the same weight in a queue of queues (e.g., virtual connections A, B, and C in a first queue of weight 2, and virtual connections D, E, and F in a second queue of weight 1) and implementing weighted round-robin among these queues of queues.

There is provided a selector for every ATM output port. For example, FIG. 3 shows a selector 370 associated with ATM output port 317. A selector is coupled to all schedulers associated with connections going to its ATM output port and selects ATM cells among schedulers using a preselected criteria. For example, selector 370 may select ATM cells from schedulers 350, 352, 354, and 356 using a round-robin technique, a weighted round-robin technique, or on a pure priority basis (since each scheduler may be associated with a given data switching priority). Together schedulers and selectors are arranged such that selection among the various ATM sources are performed in a manner that is appropriate in view of the respective switching priorities and that is fair. It will be appreciated that the actual technique selected for each scheduler and selector in ATM switch 300 may vary depending on the nature of the information carried and other considerations specific to user preference.

Figure 4:
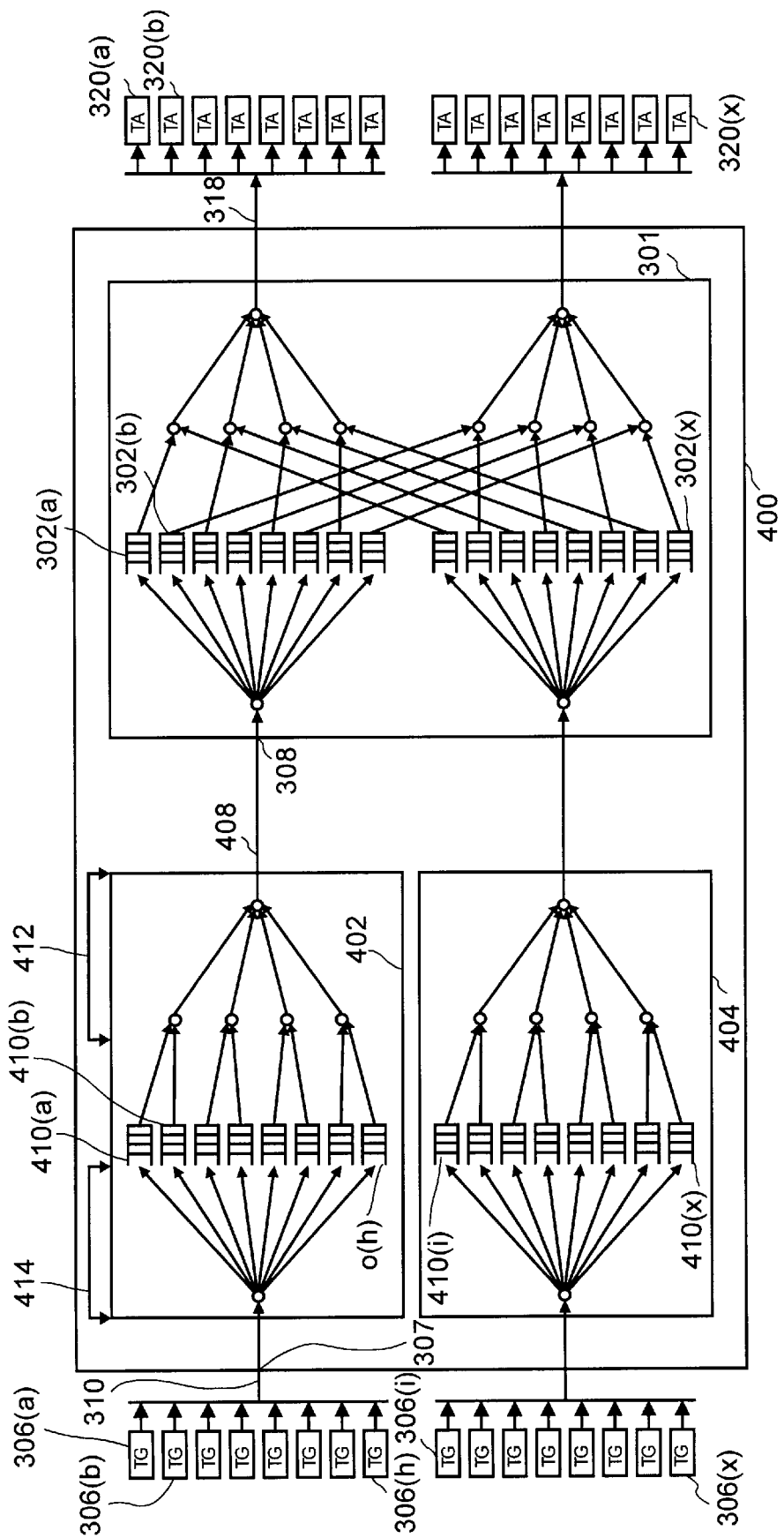
FIG. 4 illustrates, in accordance with one embodiment of the present invention, an inventive ATM switch which offers per-virtual connection buffering and per-virtual connection back-pressure.
Figure 5:
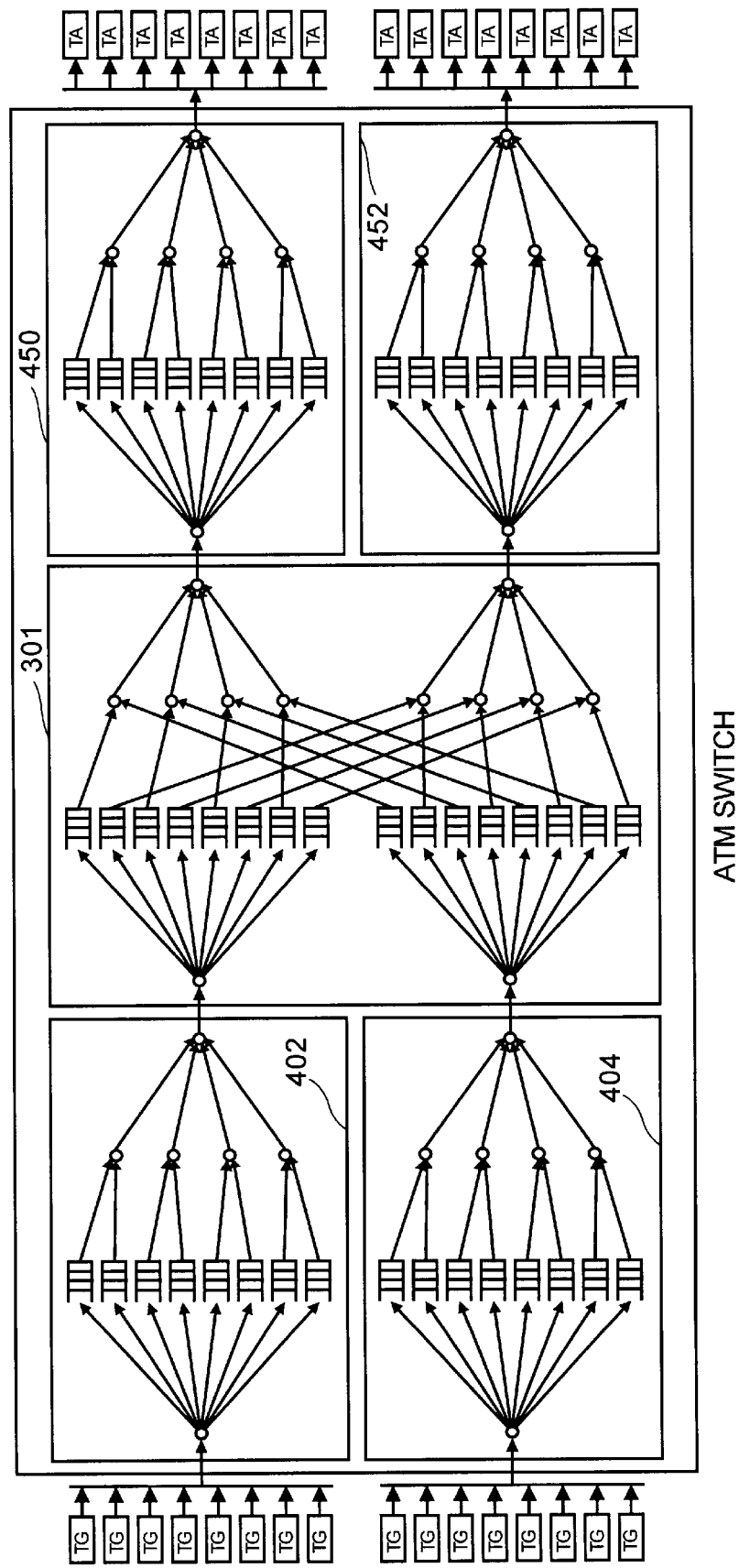
FIG. 5 illustrates the ATM switch of FIG. 4, including output SAP's for performing per-virtual connection output buffering.

To further improve buffering capability, and more importantly to provide for improved condition management on a connection-by-connection basis, there are provided, in accordance with one embodiment of the present invention, structures for allowing back-pressuring to be accomplished on a per-VC basis. In one embodiment, per-VC back-pressuring is accomplished via the provision of switch access port (SAP) structures, which include another plurality of buffering structures for buffering the incoming ATM cells if the buffer structures 302(a)–(x) in switch element 301 are filled. With reference to FIG. 4, there is shown an ATM switch 400, which includes switch element 301 of FIG. 3 and incoming SAP structures 402 and 404. For ease of discussion, only SAP structure 402 is discussed in detail since SAP structure 404 is an analogous structure whose operation will be apparent to those skilled in the art given this disclosure.

Incoming SAP structure 402 is coupled to switch matrix input port 308 of switch element 301 via a link 408, which may represent for example a fiber optic link, a wireless link, or a conducting link. Incoming SAP structure 402 is further coupled to link 310 through input port 307 of ATM switch 400. Link 310, as discussed earlier in connection with FIG. 3, couples with a plurality of traffic generators TG 306(a)–TG 306(h).

Within SAP structure 402, there are shown a plurality of buffer structures 410(a)–410(q), each of which corresponds to a respective one of buffer structures 302(a)–302(q) of switch element 301. There are also shown an input routing portion 414 representing the circuitry for routing data from link 310 to buffer structures 410(a)–410(h), and an input arbitrating portion 412 representing the circuitry for arbitrating access from buffer structures 410(a)–410(h) to link 408. In one embodiment, input arbitrating portion 412 may be omitted and individual ones of buffer structures 410(a)–(q) may be directly coupled with corresponding ones of buffer structures 302(a)–(q). More typically, the outputs from buffer structures 410(a)–(q) are aggregated using input arbitrating portion 412 within SAP 402 prior to being output onto common high-speed link 408 for transmission to switch matrix input port 308 of switch element 301. Input arbitrating portion 412 may be implemented in a manner similar to output arbitrating portion 314 of FIG. 3, i.e., via schedulers and selectors, or in any conventional manner so as to ensure fair and appropriate selection of ATM cells in view of the respective priorities of the input data and other user preferences.

In accordance with one aspect of the present invention, ATM cells corresponding to a connection are buffered at one of buffer structures 302(a)–(x) first. When that buffer structure (one of buffer structures 302(a)–(x)) is filled, the connection is then back-pressured from switch matrix 301, and the excess ATM cells are then stored in a corresponding one of buffer structures 410(a)–(x). By way of example, ATM cells corresponding to the connection from traffic generator 306(a) is first buffered in buffer structure 302(a) within switch element 301. If buffer structure 302(a) becomes full, buffer 410(a) is then employed to store the excess ATM cells.

In this manner, back-pressuring is also performed on a per-VC basis (in addition to the per-VC buffering provided by the buffer structures within switch element 301). The presence of an additional buffer structure in the virtual connection allows the connection to absorb bursts of data in a more efficient manner (through per-VC buffering at the central switch and then through per-VC back pressuring). It should be apparent to those skilled that the buffers herein may be implemented with low bandwidth buffers, which lower implementation cost.

Further, the ability to control the buffer size and/or usage on a per-VC basis advantageously permits the overall shared buffer space to be utilized more efficiently. For example, the threshold associated with individual connections (the threshold determines the maximum buffer size for a given connection) may be individually set such that overall buffer utilization may be optimized.

In one embodiment, the shared buffer space in the central switch 301 may be optimized by specifying the threshold window for each virtual connection. By way of example, the threshold may be specified with two values: a minimum value and a maximum value. If the number of cells buffered falls below the minimum value, the back pressure is removed, thereby allowing the input port to start sending cells again to the central switch. Conversely, if the number of cells buffered exceeds the maximum value, back-pressure is enabled. As can be appreciated from the foregoing, the provision of the threshold window advantageously reduces the back pressure traffic associated with each connection.

Additionally, the buffer threshold may be set for groups of VC's. By way of example, a threshold or a threshold window may be set for a group of VC's having the same priority. If the number of cells buffered for that group exceeds the maximum threshold, back pressuring may commence. The same concept may of course apply for VC's grouped on another basis.

The provision of additional buffer structures within SAP structure 402 improves throughput of ATM cells since the additional buffer structures represent a mechanism for absorbing bursts of data from the traffic generators. In the past, when a connection is no longer able to handle the amount of ATM cells output by a traffic generator, an instruction is generated to instruct that traffic generator to slow down until traffic on that connection improves. In the present invention, that traffic generator may continue to send out data at full speed and the excess data, when the buffer structure in switch element 301 that corresponds to that connection is filled, is buffered by a corresponding buffer element in SAP structure 402.

Figure 2C:
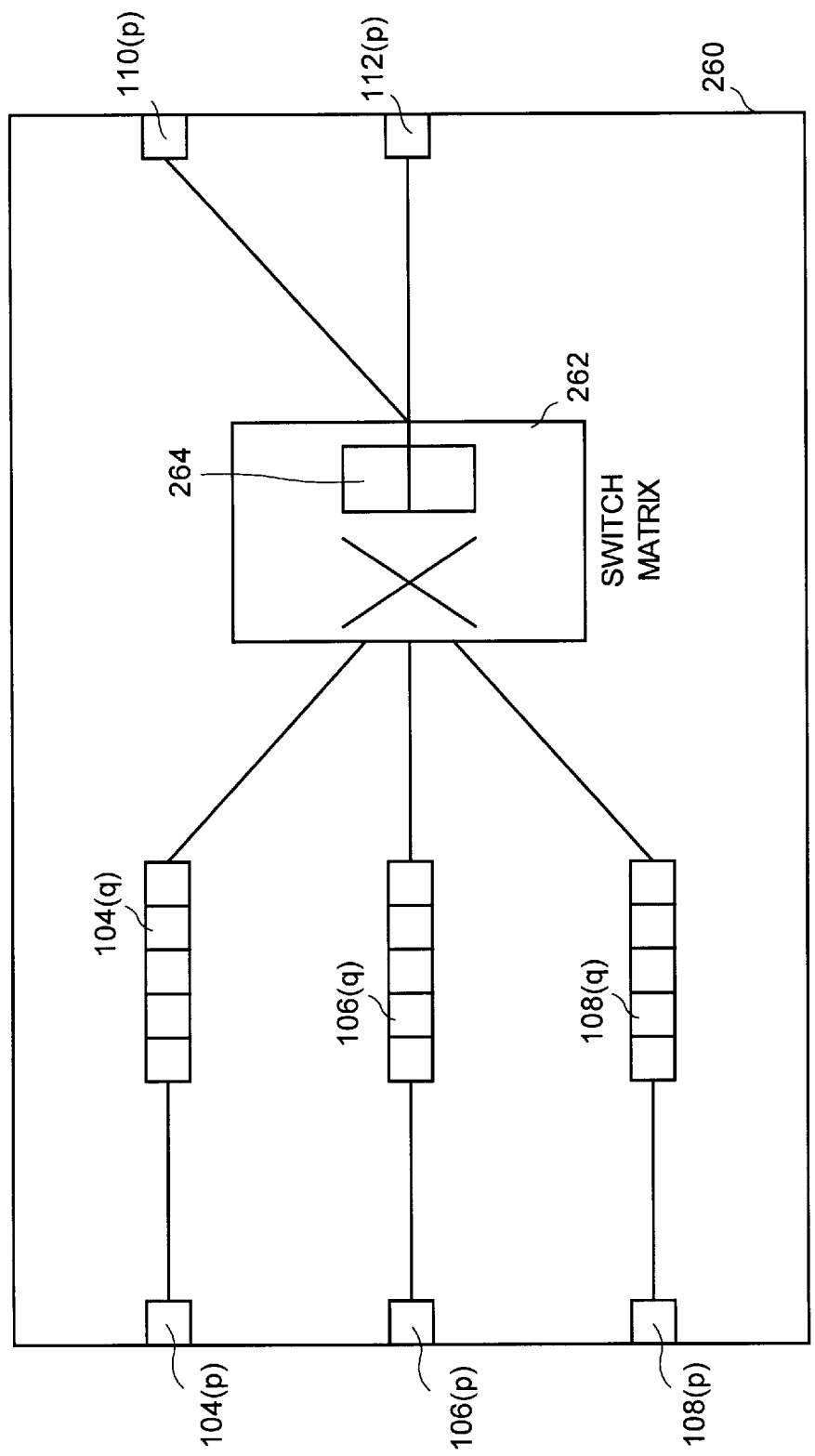
FIG. 2C illustrates a prior art hybrid switch, representing another prior ATM switch architecture which attempts to tradeoff performance and cost.

Most importantly, this back pressure mechanism operates on a per-VC basis. As a consequence, heavy traffic on one connection will not impede traffic on another connection that may be sharing the same ATM port. This is unlike the prior art architecture of FIG. 2C wherein back-pressure is done on a per-port basis. When back-pressure is necessitated in the prior art, the possibility of head-of-the-line blocking is present since ATM cells going to different destinations may be held up in the same buffer structure during back-pressure.

Furthermore, the per-VC buffering and per-VC back pressuring features offered by the inventive switch architecture further permit condition management to be performed on a connection-by-connection basis. In other words, it is possible to control the throughput rate of an individual ATM connection through ATM switch 400 (or ATM switch 300 of FIG. 3)without substantially impacting the throughput rate of another individual ATM connection. For example, by allowing a connection to have a larger back pressure buffer space, e.g., buffer 410(*a*), that connection may be able to handle larger bursts of data.

Link 318 of ATM switch 400 (as well as of ATM switch 300) may be directly coupled to the output port of the ATM switch. Alternatively, in the embodiment of FIG. 5, output buffering on data out of switch element 301 may be provided on a per-VC basis using an output SAP's 450 and 452 (switch access port), which are similar in structure and function to SAP 402 of FIG. 3. When per-VC output buffering is provided in addition to the per-VC back-pressuring and per-VC input buffering (as shown in FIG. 4), each connection may advantageously be controlled on both the input side and the output side (relative to switch element 301). By way of example, it is possible to offer traffic shaping on a per-VC basis using the buffer structure at the output SAP to control the amount of ATM cells that traverse each connection. By individually controlling or shaping the traffic on each connection, the overall traffic through the ATM switch may be optimized for a given network.

Figure 6:
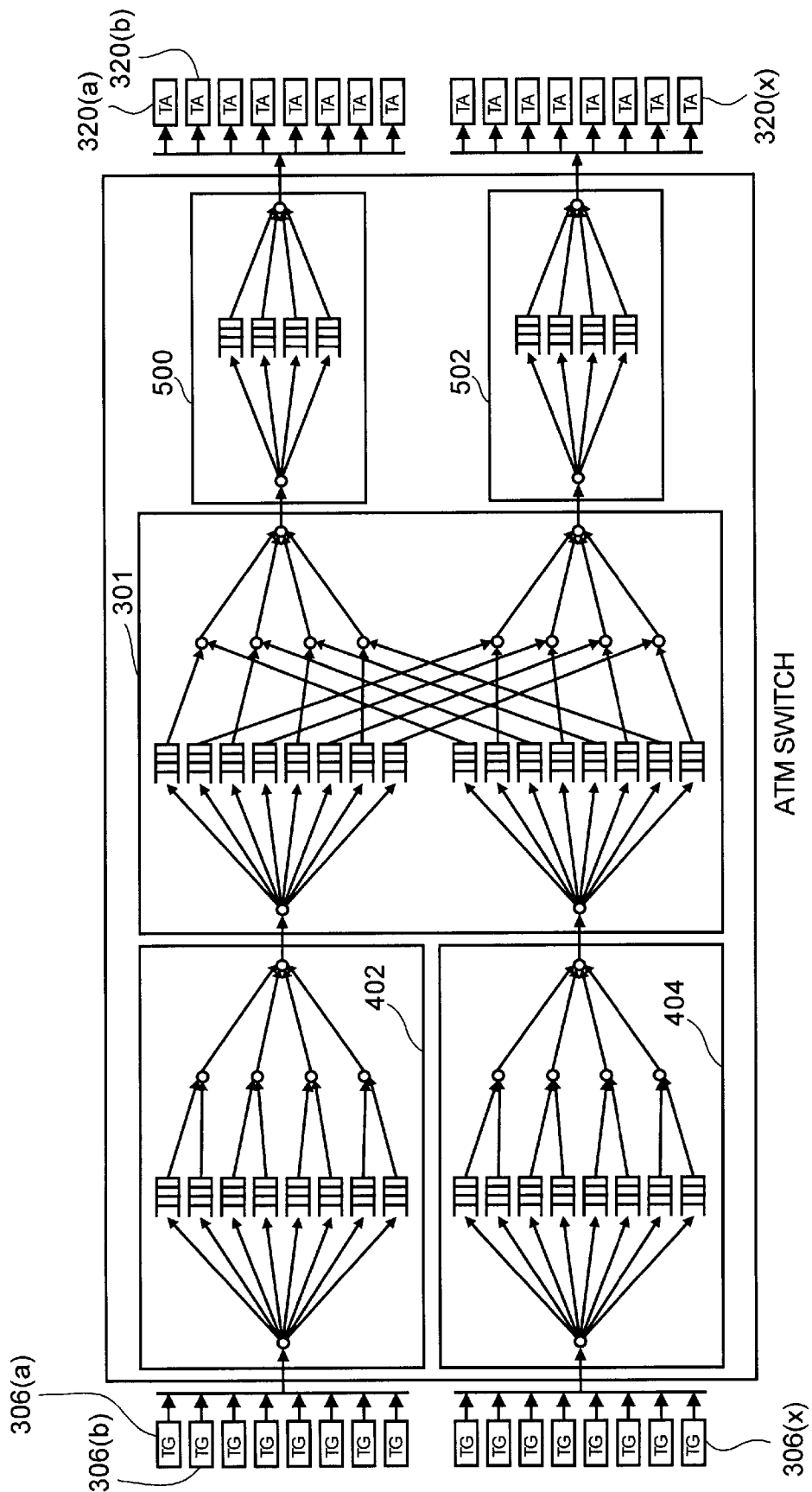
FIG. 6 illustrates the ATM switch of FIG. 4, including simplified output SAP's for performing output buffering.

In another embodiment, a simplified output SAP may be provided. FIG. 6 shows an example of simplified output SAP's 500 and 502 being employed for buffering ATM cells output by switch element 301 prior to being output to traffic acceptors 320(*a*)–320(*h*). Within output SAP 500, for example, there are shown buffer structures 504, 506, 508, and 510 for buffering ATM cells output via schedulers 350, 352, 354, and 356.

It is possible, in some cases, to use a simplified SAP with smaller and/or fewer buffer structures because if traffic shaping is not necessary for a network, e.g., for some LAN's, the output SAP is required to only match the output rate of switch 301 with the rate of the ATM output port. Consequently, smaller and/or fewer buffers may be employed in such simplified SAP's. As can be appreciated by those skilled in the art, the ability to employ smaller and/or fewer buffer structures in output SAP's 500 and 502 advantageously reduce implementation cost.

While this invention has been described in terms of several preferred embodiments, there are alterations, permutations, and equivalents which fall within the scope of this invention. By way of example, although the invention is disclosed with reference to an ATM switch having a depicted number of schedulers, selectors, buffer structures in either the switch element or the switch access ports, the number of these circuits present in a given implementation may vary depending on need. Further, there is no theoretical limitation on the number of ATM ports connected to a given switch, or the number of traffic generators and traffic acceptors that can be coupled to each port. It should also be noted that there are many other alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An Asynchronous Transfer Mode (ATM) switching circuit configured for implementing per virtual connection arbitration while switching ATM cells associated with a plurality of virtual connections to an output port of said switching circuit, said output port being configured to output said ATM cells to a plurality of traffic acceptors, comprising:

an output arbitrating portion coupled to said output port, said output arbitrating portion including a plurality of schedulers coupled to receive said ATM cells from said plurality of virtual connections and configured to schedule said ATM cells for output to said output port in accordance with priorities accorded individual ones of said plurality of virtual connections, said output arbitrating portion further includes a selector coupled between said plurality of schedulers and said output port, said selector being configured to select cells from said plurality of schedulers for output to said output port.

2. The ATM switching circuit of claim 1 wherein said connections of said virtual connections having the same priority are coupled to a scheduler of said plurality of schedulers.

3. The ATM switch of claim 1 wherein at least one scheduler of said plurality of schedulers selects cells using a weighted round robin selection technique.

4. The ATM switch of claim 1 wherein said priorities are accorded said individual ones of said plurality of virtual connections based on the type of data carried by said individual ones of said plurality of virtual connections.

5. An Asynchronous Transfer Mode (ATM) switching circuit configured to implement per virtual connection back-pressuring while switching ATM cells between an input port of said switching circuit and an output port of said switching circuit, said input port being configured to receive said ATM cells from a plurality of traffic generators, comprising:

an input switch access port (SAP) coupled to said input port, said input switch access port including a plurality of first buffers configured to buffer ATM cells from said plurality of traffic generators;

a switch element coupled to said input SAP, said switch element including a buffer portion configured to receive said ATM cells from said input SAP, said buffer portion including a plurality of second buffers configured to buffer said ATM cells, a given one of said plurality of first buffers is associated with a given one of said plurality of said second buffers, wherein said given one of said second buffers is engaged to buffer said ATM cells prior to said given one of said given one of said first buffers is engaged to buffer said ATM cells.

6. The ATM switching circuit of claim 5 wherein said given one of said first buffers is not engaged to buffer said ATM cells until said given one of said second buffers is full.

7. The ATM switching circuit of claim 6 wherein said given one of said first buffers and said given one of said second buffers are configured to receive cells from a given traffic generator of said plurality of traffic generators.

8. A method for implementing per virtual connection back-pressuring while switching ATM cells between an input port of said switching circuit and an output port of an ATM switching circuit, said input port being configured to receive said ATM cells from a plurality of traffic generators, comprising:

buffering, using one of a plurality of first buffers associated with a switch element of said ATM switching circuit, said plurality of first buffers being configured to buffer said ATM cells from said plurality of traffic generators, first ATM cells from a given traffic generator of said plurality of traffic generators; and if buffer usage at said one of said plurality of first buffers reaches a predefined threshold, buffering, using one of a plurality of second buffers, second ATM cells from said given traffic generator, said plurality of second buffers being disposed between said plurality of first buffers and said input port.

* * * * *